(12) United States Patent
Jackson et al.

(10) Patent No.: US 10,883,571 B2
(45) Date of Patent: Jan. 5, 2021

(54) MOORING CONNECTOR

(71) Applicant: BALLTEC LIMITED, Morecambe (GB)

(72) Inventors: Jonathan Jackson, Poulton-Le-Fylde (GB); Marco Teixeira, Lancaster (GB); William David Loton Parry, Preston (GB)

(73) Assignee: BALLTEC LIMITED, Morecambe (GB)

( * ) Notice: Subject to any disclaimer, the term of this patent is extended or adjusted under 35 U.S.C. 154(b) by 50 days.

(21) Appl. No.: 16/309,869

(22) PCT Filed: Jun. 27, 2017

(86) PCT No.: PCT/GB2017/051874
§ 371 (c)(1),
(2) Date: Dec. 13, 2018

(87) PCT Pub. No.: WO2018/002605
PCT Pub. Date: Jan. 4, 2018

(65) Prior Publication Data
US 2019/0309824 A1 Oct. 10, 2019

(30) Foreign Application Priority Data
Jun. 27, 2016 (GB) .................................. 1611126.2

(51) Int. Cl.
*F16G 11/10* (2006.01)
*B63B 21/04* (2006.01)
(Continued)

(52) U.S. Cl.
CPC ............ *F16G 11/108* (2013.01); *B63B 21/04* (2013.01); *B63B 21/502* (2013.01); *E21B 41/10* (2013.01);
(Continued)

(58) Field of Classification Search
CPC ........ B63B 2021/003; B63B 2021/004; B63B 21/04; B63B 21/502; F16G 11/108; E21B 41/10
See application file for complete search history.

(56) References Cited

U.S. PATENT DOCUMENTS 3,405,965 A * 10/1968 Eberhard .................. B66C 1/66
    294/82.28
3,430,305 A * 3/1969 Geffner ................ B64D 17/383
    24/603
(Continued)

FOREIGN PATENT DOCUMENTS

EP    1710450 A1    10/2006
GB    1358282 A     7/1974
(Continued)

OTHER PUBLICATIONS

Patent Cooperation Treaty: International Search Report and Written Opinion for PCT/GB2017/051874 dated Oct. 12, 2017; 10 pages.
(Continued)

*Primary Examiner* — Robert Sandy
*Assistant Examiner* — David M Upchurch
(74) *Attorney, Agent, or Firm* — Schwabe Williamson & Wyatt, PC

(57) ABSTRACT

A connector adapted for release under load from a complementary connector. The connector having a locking element for engagement with the complementary connector to lock the complementary connector to the connector; and a locking member moveable from a locked position to an unlocked position. The locking member operative to permit the/each locking element to lock the complementary connector to the connector when in the locked position and operative to allow the/each locking element to release the complementary connector when in the unlocked position. The locking member and locking element arranged such that when the connector is locked to the complementary connector and the locking member is in a partially unlocked position, a load applied to the/each locking element causes the/each locking element to urge the locking member towards its fully unlocked position, thereby unlocking the complementary connector from the connector.

20 Claims, 6 Drawing Sheets

(51) Int. Cl.
  *E21B 41/10*   (2006.01)
  *B63B 21/50*   (2006.01)
  *B63B 21/00*   (2006.01)

(52) U.S. Cl.
  CPC ... *B63B 2021/003* (2013.01); *B63B 2021/004* (2013.01)

(56) References Cited

U.S. PATENT DOCUMENTS

| | | | |
|---|---|---|---|
| 4,573,725 A | 3/1986 | Griffiths | |
| 4,799,816 A | 1/1989 | Lechon | |
| 4,863,205 A | 9/1989 | Schron | |
| 7,104,505 B2* | 9/2006 | Tchoryk | B64G 1/646 244/115 |
| 9,683,416 B2* | 6/2017 | Rogers | E21B 23/04 |
| 9,771,762 B2* | 9/2017 | Baudoin | E21B 17/06 |
| 2014/0110129 A1 | 4/2014 | Schmidt | |
| 2016/0052752 A1* | 2/2016 | Walmsley | F16L 1/20 403/373 |

FOREIGN PATENT DOCUMENTS

| | | | |
|---|---|---|---|
| GB | 2424684 A | 10/2006 | |
| WO | 01/87761 A1 | 11/2001 | |
| WO | 2006/109065 A1 | 10/2006 | |

OTHER PUBLICATIONS

Intellectual Property Office: Search Report under Section 17 for GB Application No. 1615733.1 dated Feb. 28, 2017; 2 pages.

\* cited by examiner

MOORING CONNECTOR

CROSS-REFERENCE TO RELATED APPLICATION

The present application is a national phase entry under 35 U.S.C. § 371 of International Application No. PCT/GB2017/051874, filed Jun. 27, 2017, which designates the United States of America, which claims priority to GB Application No. 1611126.2, filed Jun. 27, 2016, the entire disclosures of each of these applications are hereby incorporated by reference in their entireties and for all purposes.

TECHNICAL FIELD OF THE INVENTION

The present invention relates to a connector, and in particular to a mooring connector configured to release under load from its locking with a complementary connector. The connector may be a mooring connector or for use in lifting or other operations.

BACKGROUND TO THE INVENTION

In one application, mooring connectors are used to connect drilling rig mooring lines together to secure a drilling rig to the seabed. A secured drilling rig may need to be released and moved to avoid inclement weather such as a storm. Economically, it is desirable to release the mooring connectors and begin to move the drilling rig only if absolutely necessary, so as to minimise down time. In practice, this means that one would typically wait for a storm to build up to a certain degree before releasing the drilling rig.

"Release under load" mooring connectors are designed for this purpose and are therefore configured to function when the connected mooring lines are under tension and a load is applied to the mooring connector. A problem with existing mooring connectors is that they can be irreparably damaged if released from one another under too great a load.

To avoid this, release under load mooring connectors have a specified safe limit at which they should be released when under a load. For existing release under load mooring connectors this limit is about 30% of the minimum break load (MBL), which is the minimum load at which damage will be caused to the mooring connector.

The need to release connectors whilst the applied load is under a safe threshold results in mooring lines being released at an early stage when there is a potential problem, and on occasions where the potential problem is never realised. Any release causes equipment downtime, which is economically undesirable.

Embodiments of the present invention seek to provide a connector, particularly a mooring connector, that may be safely released from a complementary connector when under a greater load than connectors of the prior art. This delays or eliminates the need for mooring lines to be released and thus enables increased utilisation of the moored equipment.

SUMMARY OF THE INVENTION

According to a first aspect of the present invention, there is provided a connector adapted for release under load from a complementary connector, the connector comprising:
at least one locking element for engagement with the complementary connector to lock the complementary connector to the connector; and
a locking member moveable from a fully locked position to a fully unlocked position, the locking member being operative to permit the or each locking element to lock the complementary connector to the connector when in the fully locked position and being operative to allow the or each locking element to release the complementary connector from the connector when in the fully unlocked position,
wherein the locking member and locking element are arranged such that when the connector is locked to the complementary connector and the locking member is in a partially unlocked position, a load applied to the or each locking element caused by a load urging the connector and the complementary connector apart causes the or each locking element to urge the locking member towards its fully unlocked position, thereby unlocking the complementary connector from the connector.

In this way, the present invention is configured to use a load applied to a connector that could otherwise damage the connector to assist in its unlocking from a complementary connector, when the connector and complementary connector are released from one another whilst under the load. Specifically, this reduces the likelihood of a connector being damaged when released under load. It is in a state of partial release that a connector is likely to be damaged when released under load, when the load carried by the connector may be supported by partially engaged components and so the load is supported by a reduced surface area or mass of material. However, with the present invention, load applied to the connector when in a partially unlocked state causes the connector to rapidly move into an unlocked state. This allows the complementary connector to separate without the potentially damaging load being taken up by the connector in a partially unlocked state.

The present invention therefore provides a connector that can be safely released from its locking with a complementary connector whilst the connector and the complementary connector are under a high load pulling them apart. In particular, embodiments of the present invention can be released from their complementary connectors when the load is a high percentage of their minimum break load (MBL), such as up to 75%, compared to conventional connectors that must be released at 30% of their MBL to avoid damage. Accordingly, when used as a release under load connector that, for example, secures a drilling rig to the seabed, as described above, the present invention can allow an operator to delay release of the drilling rig under inclement weather conditions, allowing the weather to get worse and increasing the tension across the mooring line, in order to more accurately determine if release is necessary. This may lead to reduced down time and thus increased revenue and profits. In addition, since existing release under load connectors must be released at around 30% of their MBL, they are typically massively over specified to accommodate for this, which increases their cost, weight and complexity. As embodiments of the present invention can be released at up to 75% of their MBL, they are cheaper, lighter and less complicated than conventional release under load connectors with an equivalent maximum release load.

The connector may be a male connector. The complementary connector may be a female connector.

The connector may comprise a body. The body may be elongate, defining a longitudinal axis between its ends. The body may be cylindrical and/or hollow. The body may comprise a front end for steering towards a complementary connector. The front end may be frustoconical. The front end may have a chamfered rim for assisting in insertion into the complementary connector.

The body may comprise an aperture, one or more apertures or a plurality of apertures. The or each aperture may be formed in an outer surface, for example and outer cylindrical surface, of the body which may form part of a ball cage. Each aperture may be a substantially cylindrical bore. Each aperture may be obliquely angled towards the front end of the body, from its radially inward region to its radially outward region. That is to say, the angle between the axis of the or each aperture and the longitudinal axis of the connector body may be acute. In embodiments the angle is in the range 60 to 70 degrees. Alternatively, each aperture may be angled perpendicular to the longitudinal axis of the body. Each aperture may extend from an inside surface of the body to an outside surface of the body. Each aperture may be for receiving and at least partially housing a locking element. Each aperture may comprise a portion having a slight reduction in diameter of the aperture at a radially outer region, thereby preventing a locking element passing radially out through the aperture. The apertures may be circumferentially substantially equidistantly spaced apart. The apertures may be arranged in at least one or multiple rows spaced circumferentially around the connector. Each row of apertures may be circumferentially in line with the next row. Each row of apertures may be circumferentially offset from the next row.

The locking member may be housed within the connector. The connector may comprise a biasing means for biasing the locking member from its fully unlocked position or partially unlocked position towards its fully locked position. The biasing means may be resilient and may be a spring. The locking member may be formed from a metal.

The locking member may comprise a pocket, one or more pockets or a plurality of pockets, formed in an outer surface of the locking member. Each pocket in the locking member may correspond to an aperture in the connector body. Each pocket may be sized and/or shaped for partially housing or receiving a locking element, which may be rounded. For example, each pocket may be partially hemispherical. The pockets may be circumferentially equidistantly spaced apart. The pockets may be arranged in at least one or multiple rows spaced circumferentially around the locking member. Each row of pockets may be circumferentially in line with the next row. Each row of pockets may be circumferentially offset from the next row. Each pocket may comprise a front edge and or a pocket ramp portion. The front edge and or pocket ramp portion may be formed at an angle relative to its corresponding aperture and/or relative to the locking member so that a locking member received into the pocket urges the locking member from its partially unlocked position towards its fully unlocked position.

The connector may comprise movement means being operable to move the locking member axially relative to the longitudinal axis of the connector. The movement means may be operable to move the locking member from its fully locked position to its partially locked position and/or its fully unlocked position. The movement means may comprise an actuator such as a hydraulic actuator. The hydraulic actuator may comprise a pump or accumulator that is fluidly connected to a cylinder and piston arrangement. The cylinder and piston arrangement may be configured so that axial movement of the piston moves the locking member axially relative to the longitudinal axis of the connector. The cylinder may thus be fixed in position whilst the piston may be free to move axially, or vice versa.

The movement means may be configured to be remotely operated and controlled, for example using an acoustic or radio signal.

The connector may comprise one locking element or one or more locking elements. For example, there may be at least 3, 6, 9 or 12 locking elements. The locking elements may be spherical or rolling elements such as balls, cylinders, or the like. The locking elements are preferably locking balls. The locking elements may be formed from a metal.

The connector may comprise a connection means or connector for connection to a cable, line, or the like.

When the locking member is in its fully locked position, the locking member may be spaced away from the front end of the body of the connector, each locking element may be positively urged radially outwards of the connector by the locking member and housed partially in its aperture such that an edge of each locking element protrudes from its aperture for locking the connector with a complementary connector.

When the locking member is in its fully unlocked position, the locking member may be near to or adjacent the front end of the body of the connector, each locking element may float freely of the locking member and may be received in its corresponding pocket and housed partially in its aperture such that no edge of the locking element is pushed to protrude from the aperture for unlocking the connector from a complementary connector.

When the locking member is in its partially unlocked position, each locking element may be positively urged radially outwards of the connector by the locking element and housed partially in its aperture such that an edge of each locking element protrudes from the aperture for locking the connector with a complementary connector, and a front edge of each pocket may have passed beyond a centre line of each locking element.

According to a second aspect of the invention, there is provided a connector assembly comprising a connector according to the first aspect of the invention; and a complementary connector.

The connector of the connector assembly according to the second aspect of the invention may thus comprise any or all features of the connector according to the first aspect of the invention.

The complementary connector may comprise a body. The body may be elongate, defining a longitudinal axis between its ends. The body may be cylindrical and/or hollow. The body may have an opening in one of its ends that defines an axially extending bore. The body may comprise end portions at its opening that are angled for guiding a connector into the opening so that the connector can engage with and lock to the complementary connector.

The complementary connector may comprise a groove, one or more grooves or a plurality of grooves, formed in an inner surface of the complementary connector body. The grooves may be arranged circumferentially on the complementary connector. Each groove in the complementary connector body may correspond to one or more apertures in the connector body. Each groove may be sized and/or shaped for partially housing or receiving at least one locking element, which may be rounded. For example, each groove may be substantially partially hemispherical. The width of each groove may be greater than the diameter of its corresponding locking element. Each groove may comprise a ramp portion formed at an angle relative to the apertures and/or the locking member for guiding a locking element in and out of the groove. The grooves may be circumferentially equidistantly spaced apart. The grooves may be arranged in at least one or multiple rows spaced circumferentially around the complementary connector. Each row of grooves may be circumferentially in line with the next row. Each row of grooves may be circumferentially offset from the next row.

The ramp portion of each groove may be arranged so that a load urging a locked connector and complimentary connector apart causes a radial force to be applied to a locking element received in the groove, urging it towards the connector. The complimentary connector may have a longitudinal axis and the ramp portion may extends at an angle to the longitudinal axis in the range 30 to 40 degrees.

The complementary connector may comprise a connection means or connector for connection to a cable, line, or the like.

DETAILED DESCRIPTION OF THE INVENTION

In order that the invention may be more clearly understood an embodiment thereof will now be described, by way of example only, with reference to the accompanying drawings, of which:

Figure 1:
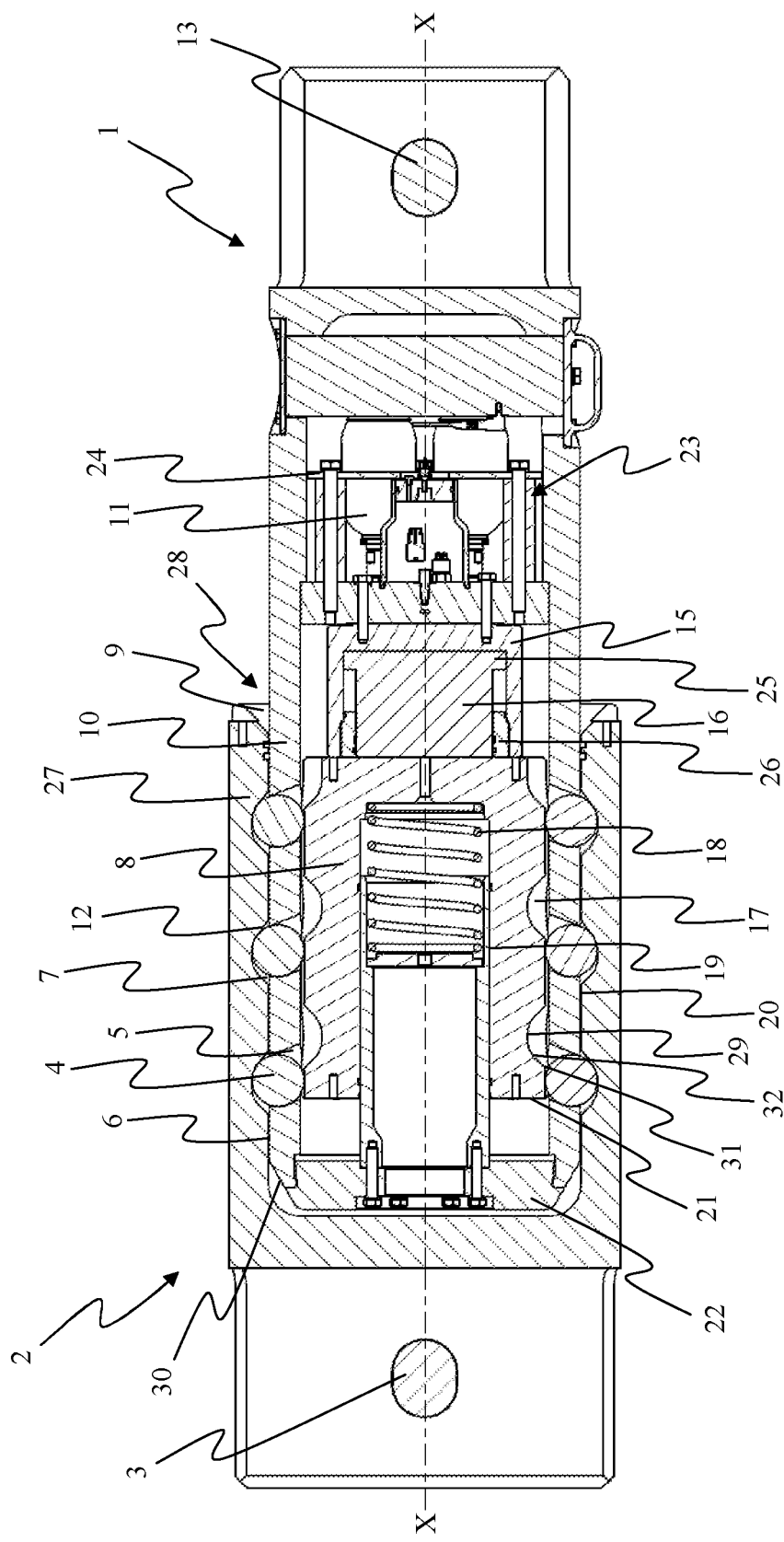
FIG. 1 is a side cross-sectional view of a connector received in a complementary connector, with the locking member in a fully locked position and the connector locked to the complementary connector.
Figure 5:
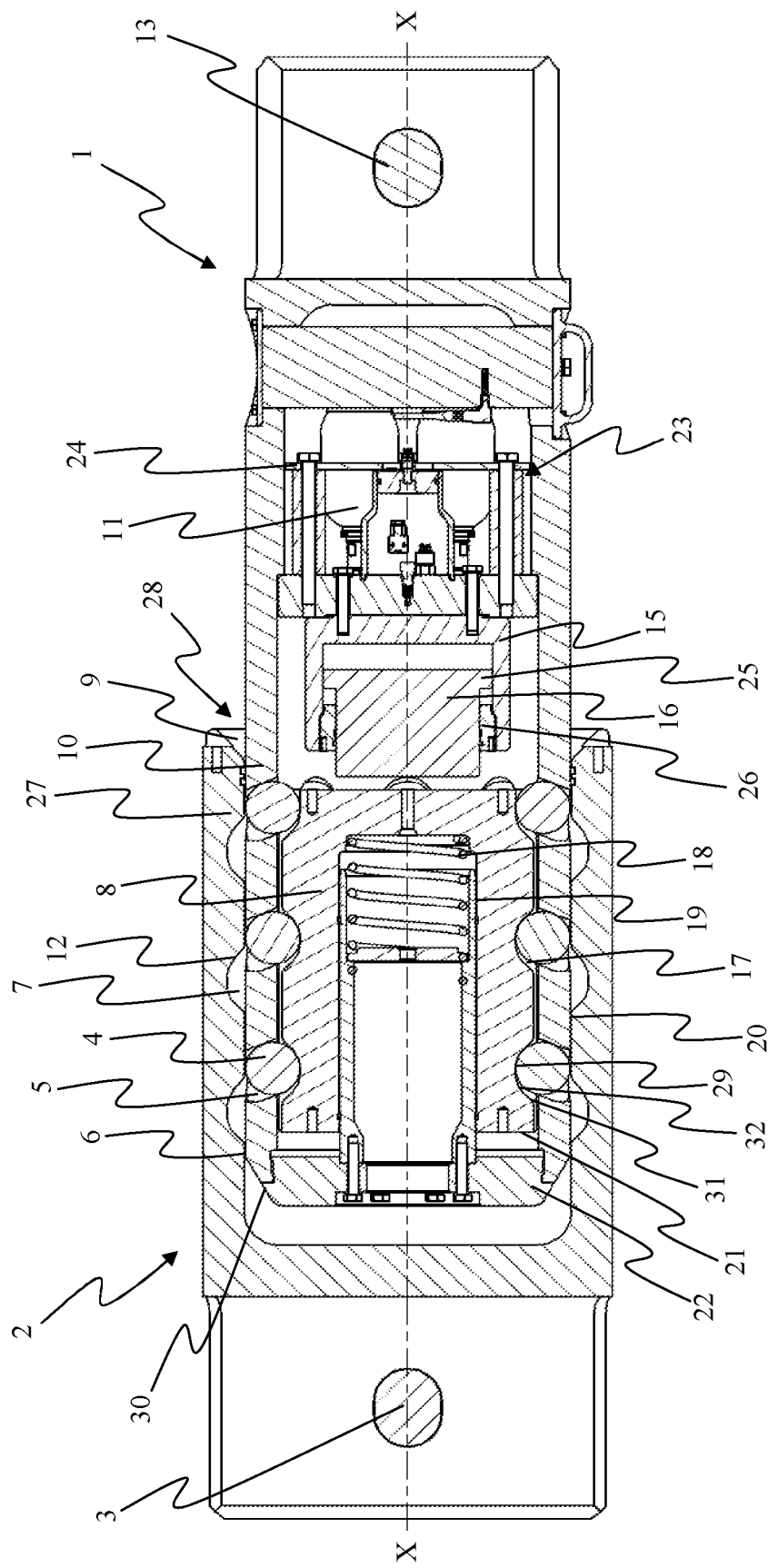
Figure 6:
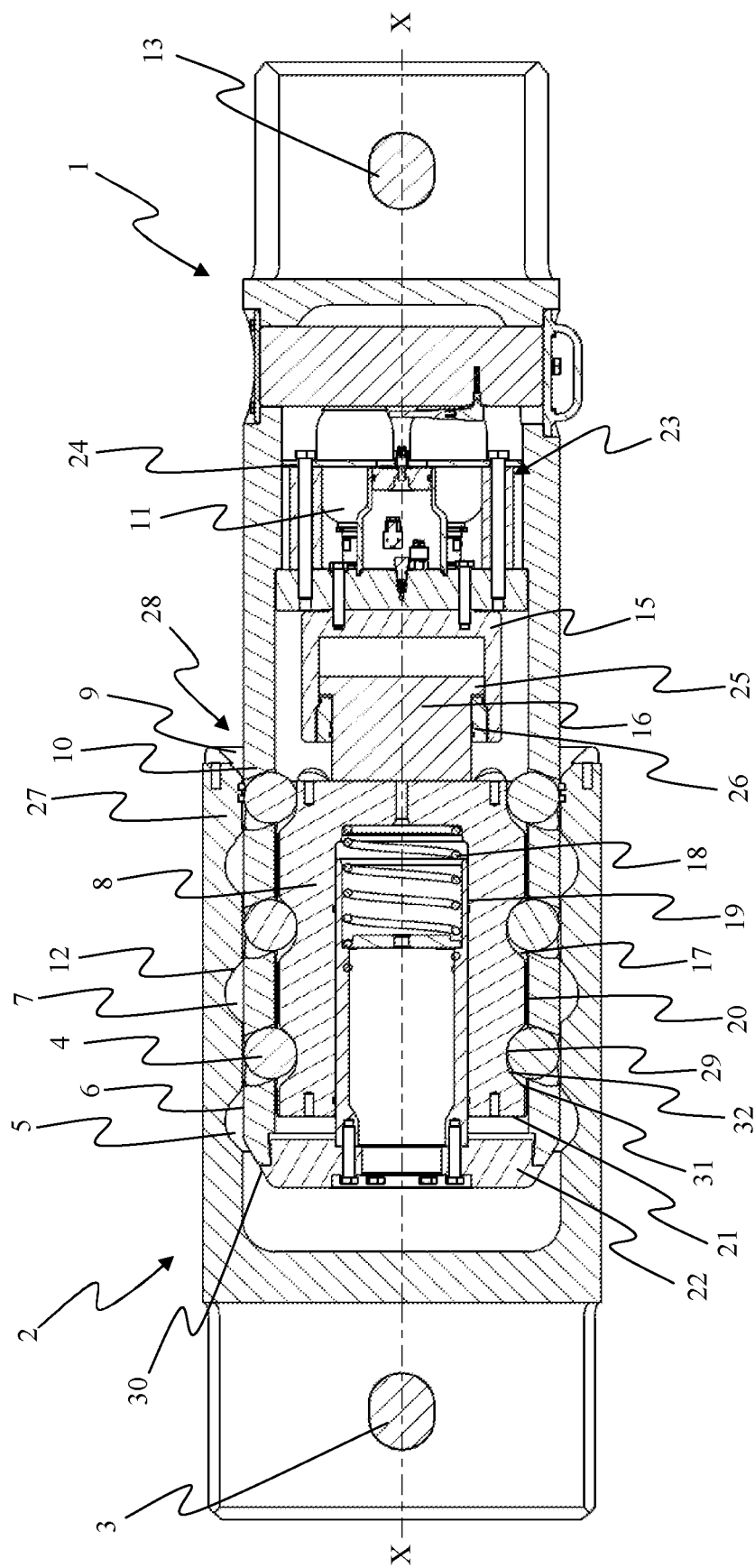

FIG. 5 is a side cross-sectional view of the connector and complementary connector of FIG. 1, with the locking member in fully unlocked position and spaced from the piston and the connector unlocked and partially withdrawn from the complementary connector; and FIG. 6 is a side cross-sectional view of the connector and complementary connector of FIG. 1, with the locking member in a fully unlocked position and the connector unlocked and partially withdrawn from the complementary connector.

Referring to FIGS. 1 to 6, there is shown a connector assembly comprising a male connector 1 engaged with a complementary female connector 2.

The complementary connector 2 comprises a substantially cylindrical body 27 having an opening 28 that defines an axially extending bore 20. An end portion 9 of the body 27 is angled so as to act as a guide to steer a frustoconical front end 22 of the connector 1 into the bore 20 so that the connector 1 can engage with and lock to the complementary connector 2. In this position, the front end 22 of the connector 1 abuts with the base of the bore 20 to prevent over-insertion.

The connector 1 comprises a substantially cylindrical body 10 having a frustoconical front end 22 and defining an axially extending internal bore 6. The front end 22 has a chamfered rim 30 to assist in insertion of the connector 1 into the complementary connector 2.

The bore 6 of the connector 1 and the bore 20 of the complementary connector 2 each (and together) have a defined longitudinal axis X due to their substantially cylindrical shape.

The bore 6 houses a substantially cylindrical locking member 8 that has an end face 21 and contains an internal bore 19. The locking member 8 sits concentrically within the bore 6 of the body 10 so that the outer surface of its wall is adjacent the inner surface of the wall of the body 10. The locking member 8 is axially slidable within the bore 6, towards and away from the front end 22 of the body 10. The bore 6 of the locking member 8 houses a biasing means, in this case a helical spring 18, which biases the locking member 8 away from the front end 22 of the body 10, towards its fully locked position.

Extending through the wall of the body 10 of the connector 1 is a plurality of circumferentially substantially equidistantly spaced apertures 5. Each aperture 5 is a substantially cylindrical bore that is obliquely angled towards the front edge 22 of the body 10, from its radially inward region to its radially outward region at an angle of between 60 and 70 degrees to the longitudinal axis of the connector.

A locking element, in this case a spherical locking ball 4, sits within each of the apertures 5 in the body 10. Each aperture 5 is sized and shaped so as to capture a locking ball 4 in such a way that a portion of the locking ball 4 can extend radially outward and inward from the aperture 5, but cannot fully escape radially outwardly from the aperture 5. This is achieved by a slight reduction in the diameter of the aperture 5 at its radially outer region. Thus, the apertures 5 allow the body 10 to act as a ball cage to restrict movement of the locking balls 4.

The locking member 8 comprises a series of circumferentially equidistantly spaced pockets 17 in the outside surface of its wall. Each pocket 17 is part hemispherical or part semi-hemispherical so as to partially receive a locking ball 4, thus the diameter of each of the pockets 17 is greater than the diameter of its corresponding locking ball 4. Each pocket 17 is formed with a curved ramp portion 32 that leads to a flattened base portion 29. Each pocket 17 also has a front edge 31 adjacent the front (free) end of the connector.

In the embodiment shown in FIGS. 1 to 6, three equidistantly circumferentially spaced rows of locking balls 4 are provided. The rows are each equidistantly axially spaced. Each locking ball 4 sits within a respective aperture 5 and the locking member 8 comprises an individual pocket 17 in respect of each locking ball 4.

Figure 2:
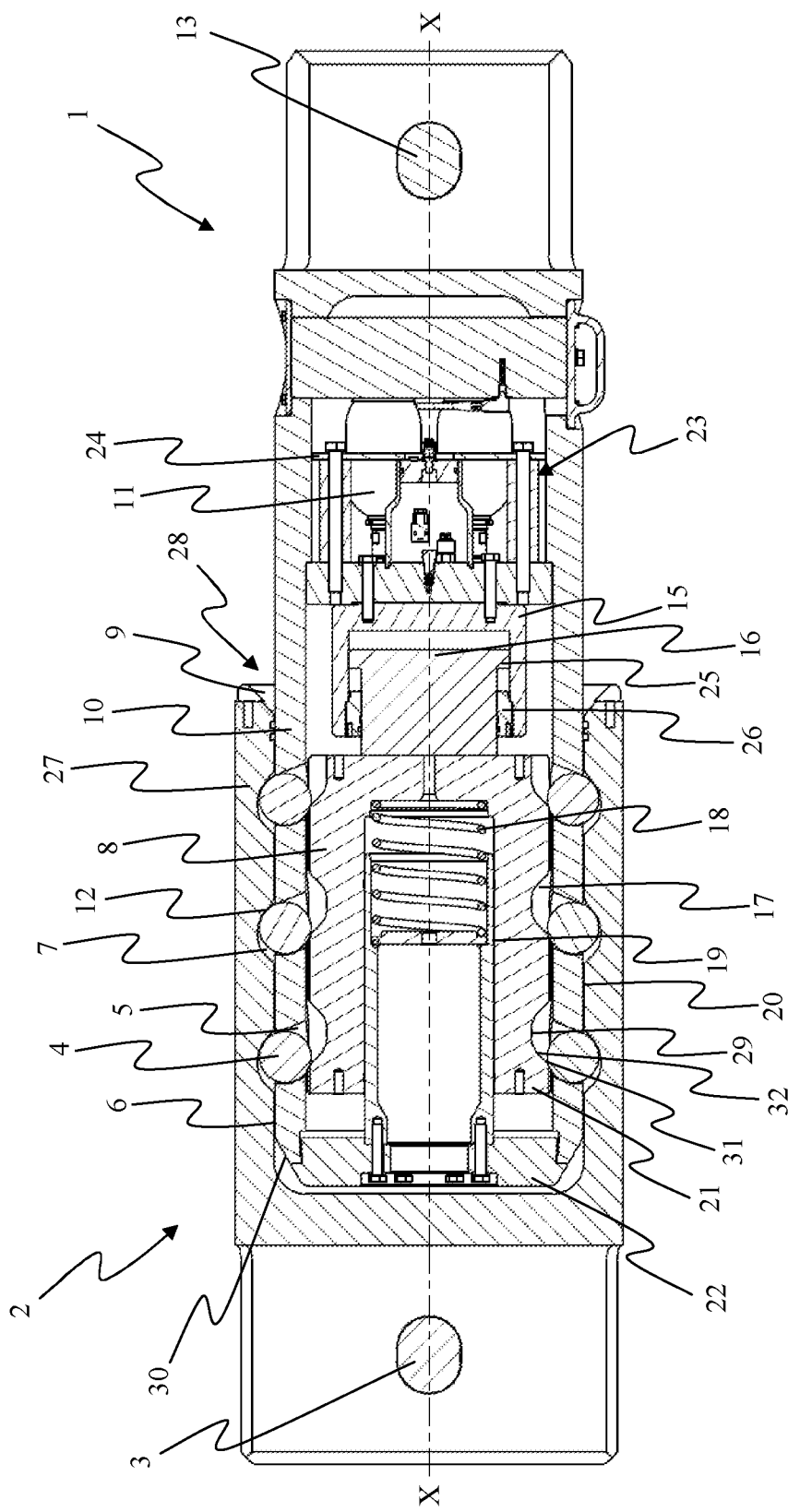
FIG. 2 is a side cross-sectional view of the connector and complementary connector of FIG. 1, with the locking member in a partially unlocked position and the connector locked to the complementary connector.
Figure 3:
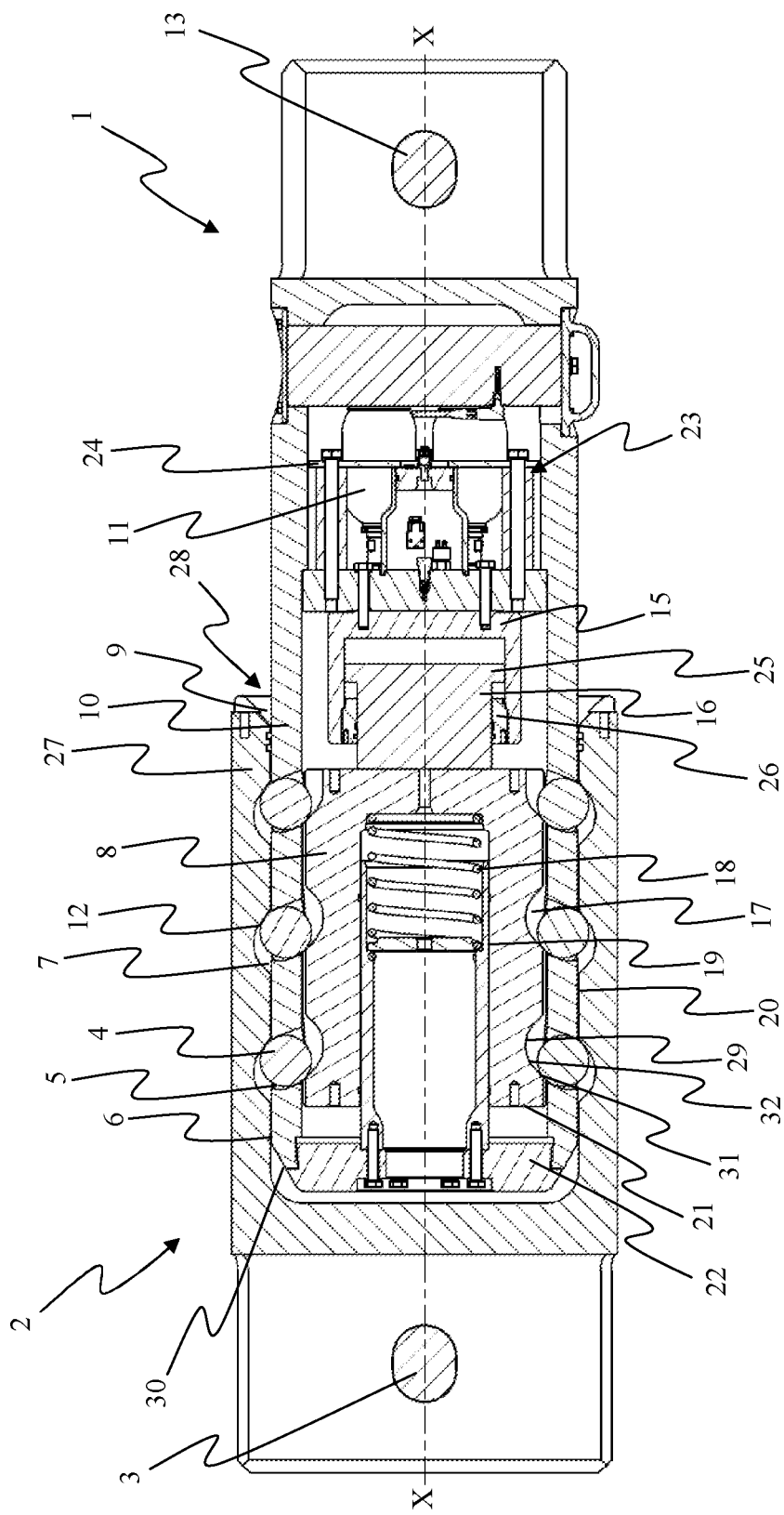
FIG. 3 is a side cross-sectional view of the connector and complementary connector of FIG. 1, with the locking member in a partially unlocked position.

When the locking member 8 is in its fully locked position, the locking balls 4 are held radially outward by the locking member 8, by contact with the outer cylindrical surface of the locking member between the pockets 17, so that each locking ball 4 protrudes radially out of its aperture 5 (as shown in FIG. 1). When the locking member 8 is in its fully unlocked position, the locking balls 4 may be partially received into their respective pocket 17 so that each locking ball 4 does not protrude radially out of its aperture 5 (as shown in FIGS. 2 and 3).

The pocket ramp and edge portions 31, 32 are each formed at an effective angle with respect to the apertures 5 such that when the locking member 8 is in a partially unlocked position, a locking ball 4 being forced into its pocket 17 urges the locking member 8 towards its fully unlocked position.

The connector 1 further comprises a hydraulic actuator 23 for pushing the locking member 8 towards the front end 22 of the body 10, against the biasing force provided by the spring 18.

The hydraulic actuator 23 comprises an accumulator 11 held within the connector 1 by a bracket 24. The accumulator 11 is fluidly connected to a cylinder 15 and piston 16 arrangement. The cylinder 15 is fixed in position so that the piston 16 may move axially relative to the cylinder 15. In the locked position, the piston 16 abuts the locking member 8 such that axial movement of the piston 16 effects axial movement of the locking member 8 relative to the connector 1. The piston 16 is stepped so as to form a protrusion 25 that retains the piston 16 within the cylinder 15 by abutting against a similar stepped protrusion 26 on the cylinder 15. The accumulator 11 and the cylinder 15 are each fluidly connected to a reservoir. The accumulator 11 is also fluidly connected to an inlet connection to allow for supply of hydraulic fluid and the reservoir is fluidly connected to an outlet connection to allow for discharge of hydraulic fluid.

The complementary connector 2 further comprises a series of circumferentially equidistantly spaced grooves 7 in the inside surface of its wall. Each groove 7 is substantially part hemispherical so as to partially receive the protruding edge of a locking ball 4. Thus, the diameter of each of the grooves 7 is greater than the diameter of its corresponding locking ball 4. Each groove 7 is formed with a ramp portion 12 that acts to guide a locking ball 4 out of the groove 7, as a result of separation of the connector and complimentary connector, when the locking ball 4 is permitted to recede back into its aperture 5 by the locking member 8 extending to its fully unlocked position.

The ramp portions 12 are each formed at an effective angle with respect to the apertures 5 such that when an axial load is applied to separate the locked connector 1 from the complementary connector 2, friction between the surfaces of the groove 7 and the aperture 5 that a locking ball 4 is in contact with reduces but does not eliminate the radial inward load applied to the locking ball 4. In embodiments the ramp portions lie at an angle to the longitudinal axis of the complimentary connector (which is substantially parallel to that of the connector when the two are engaged) in the range 30 to 40 degrees.

The connector 1 and the complementary connector 2 each comprise a connection means 3, 13 for connection to a cable, line, or the like.

In use, a mooring line attached to a drilling rig or other vessel (for example, not shown) is connected to the connection means 3 on the complementary connector 2 and a mooring line attached to the seabed or another structure such as a buoy or turret (for example, not shown) is connected to the connection means 13 on the connector 1. Accordingly, the connector 1 and the complementary connector 2 when engaged with one another act as a mooring connector that connects the two mooring lines together, which secures the drilling rig to the seabed.

To connect the mooring lines to one another, the connector 1 is inserted into the opening 28 of the complementary connector 2. This unlocked but inserted position is shown in FIG. 6. The connector 1 is then pushed into the complementary connector 2 until the front edge 22 of the connector 1 abuts with the base of the opening 28 of the complementary connector 2 to prevent over-insertion. The hydraulic actuator 23 is activated to empty the cylinder 15 of hydraulic fluid so as to allow the piston 16 to retract into the cylinder 15 and to free the locking member 8 to move axially towards the hydraulic actuator 23. The spring 18 thus pushes the locking member 8 axially towards the hydraulic actuator 23, away from the complementary connector 2. This position of the locking member 8 is shown in FIG. 2. As the locking member 8 is pushed further away from the complementary connector 2 the ramp portions 32 of the pockets 17 push the locking balls 4 radially outwards through the apertures 5 and into engagement with the grooves 7. Since the locking balls 4 have been partially displaced out of the bore 6, the locking member 8 can retract into its fully locked position where the locking balls 4 are positively urged radially outwards by the locking member 8. This action locks the complementary connector 2 to the connector 1. The fully locked position of the locking member 8 is shown in FIG. 1, where the locking member 8 is retained in the fully locked position by the biasing force provided by the spring 18.

In normal use, the connector 1 remains locked to the complementary connector 2, securing the drilling rig to the seabed. However, during inclement weather, for example a storm, the mooring lines attached to the connection means 3, 13 may be placed under significant tension, which applies a load to the connector 1 and the complementary connector 2 that urges them to be pulled apart, out of their engagement with one another. Although the slopes and relative alignment of the grooves 7 in the complementary connector 2 and apertures 5 in the connector 1 are such that a component of radial force is applied to the locking balls 4, as the locking balls 4 are supported on the cylindrical outer surface of the locking member 8 they do not impart any axial force to the locking member 8.

In particular, this load is supported by the locking balls 4 that are locking the connector 1 to the complementary connector 2. When the load reaches an upper threshold, the connector 1 and complementary connector 2 are unlocked from one another by a user (as will be described) in order to avoid irreparable damage. Alternatively, the connector 1 and the complementary connector 2 may be disengaged from one another in order to move the drilling rig to a safe area if the inclement weather is predicted to get worse.

To unlock the connector 1 from the complementary connector 2 whilst under a load, the accumulator 11 of the hydraulic actuator 23 is activated, which draws hydraulic fluid from the input connection or reservoir and drives it into the cylinder 15. The hydraulic fluid forces the piston 16 to move axially relative to the cylinder 15, towards the front end 22 of the connector 1. Consequently, this movement pushes the locking member 8 to slide axially within the bore 6, relative to connector 1, against the biasing force provided by the spring 18 and towards the front end 22. Movement of the locking member 8 in this way is not affected by the load urging the connector 1 and complementary connector 2 apart.

As the locking member 8 moves towards the front end 22 of the connector 1, the front edge 31 of each pocket 17 begins to pass over its respective aperture 5 and locking ball 4. At the same time, as the connector 1 and the complementary connector 2 are being pulled apart by the tension in their respective mooring lines, the locking balls 4 securing the connector 1 and the complementary connector 2 together are under load and being pushed out of the grooves 7 and towards the locking member 8 (and towards the longitudinal axis of the connector 1), but are retained in their apertures 5 by their contact with the front edges 31 of the pockets 17.

Figure 4:
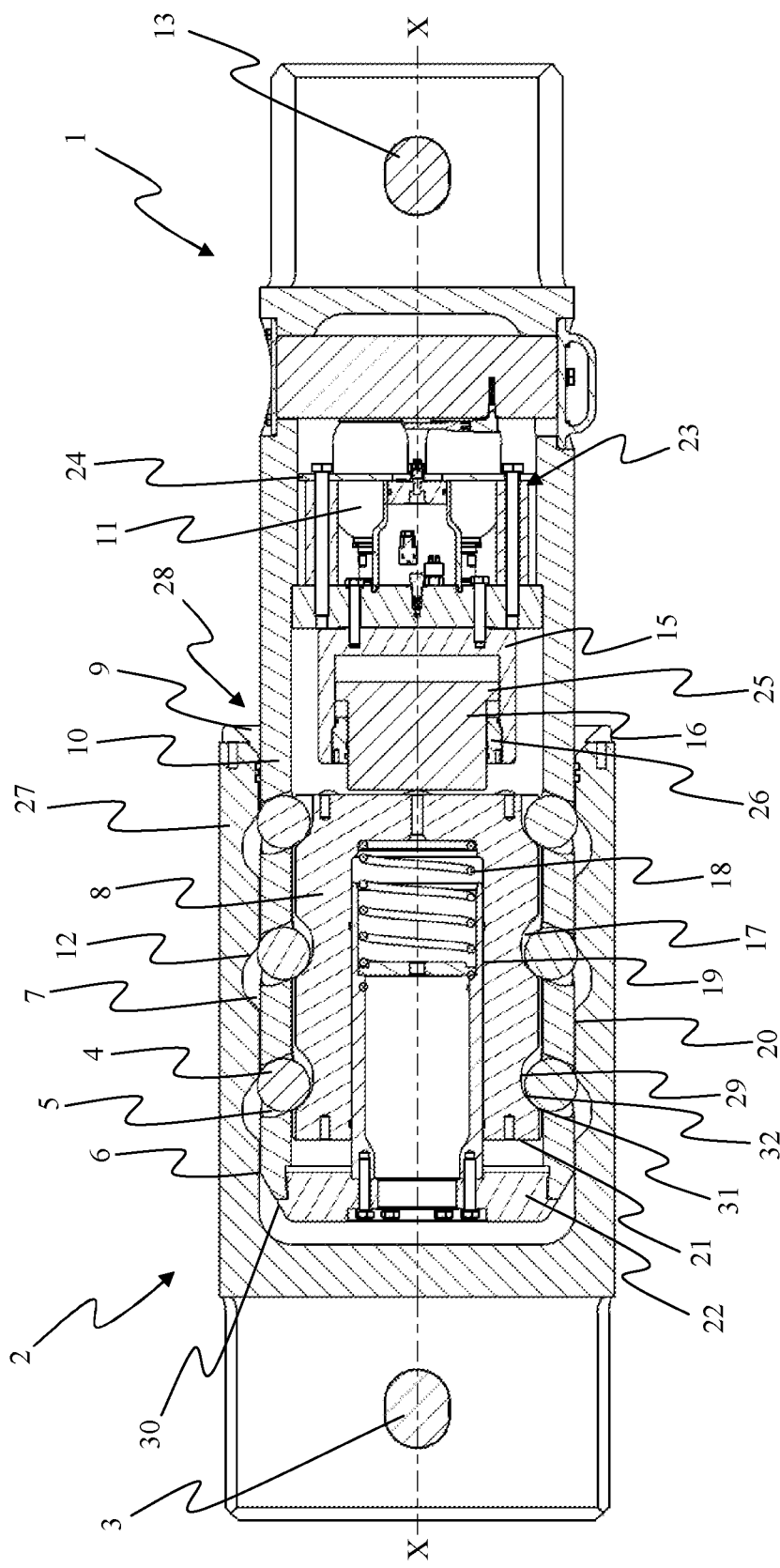
FIG. 4 is a side cross-sectional view of the connector and complementary connector of FIG. 1, with the locking member in a partially unlocked position and spaced from the piston.

As the hydraulic actuator 23 drives the locking member towards the front end 22 of the connector 1, the locking member 8 moves into a partially unlocked position where each pocket 17 is only partially open and the locking balls 4 are still retained in their grooves 7. When the front edge 31 of each pocket 17 is driven just beyond a centre point of each locking ball 4, a component of the load applied to the locking balls 4 pushes them into the their corresponding pockets 17 in the locking member 8. In particular, the oblique angle of each aperture 5 assists in causing each locking ball 4 to roll on its groove ramp portion 12, out of its groove 7 and through its aperture 5. Each locking ball 4 is then forced into its corresponding pocket 17, where it initially contacts the front edge of the pocket before contacting the pocket ramp portion 32 and eventually coming to a rest on the flattened base portion 29 of the pocket 17. The relative alignment of the ramp portion 12 of the grooves and side of the apertures 5, and to a lesser extent the front edge 31 of the pockets 7, when the locking member is in a range of partially unlocked positions is such that load urging the connector and complimentary connector apart causes the locking balls 4 to apply an axial force on the locking member urging it towards the unlocked position. This continues as the locking balls 4 are forced in to their pockets 17 and contact the pocket ramp portions 32 and results in the locking member 8 being rapidly urged towards the front end 22 of the connector 1. This movement causes the locking member 8 to break free from the piston 16 and slide into its fully unlocked position near the front end 22 of the connector 1, ahead of the piston 16, as is shown in FIG. 4. The precise alignment required will vary depending on the geometry of a particular connector assembly and is within the capability of the person of ordinary skill to determine.

When the locking member 8 is in its fully unlocked position, the locking balls 4 are retained in their pocket 17 and no longer protrude beyond the edge of their aperture 5. Thus, when the locking member 8 is in its fully unlocked position, the locking member 8 prevents the locking balls 4 from engaging with the complementary connector 2 (although it is possible that the locking balls 4 may still contact the complementary connector 2). The fully unlocked position of the locking member 8 is shown in FIGS. 5 and 6.

As this point, since the locking balls 4 are no longer engaged with the complementary connector 2, the connector 1 may be unlocked and removed from the complementary connector 2 by moving it axially away from the complementary connector 2, as is shown in FIGS. 5 and 6.

FIG. 5 shows that when the connector 1 unlocked from the complementary connector 2 the locking member 8 is still ahead of, and free from, the piston 16. In FIG. 6 the piston has caught up to the locking member 8 and abuts against it.

Indeed, in the described embodiment, as there is a load pulling the connector 1 and complementary connector 2 apart, as soon as the load acting on the locking balls 4 urges the locking member 8 into its fully unlocked position, the connector 1 is removed from the complementary connector 2, which disconnects the attached mooring lines from one another and thus releases the drilling rig from the seabed. This allows the drilling rig to be moved away from the inclement weather and avoids irreparable damage to the connector 1 and the complementary connector 2 during disconnection.

In contrast to connectors of the prior art where a load pulling a connector and its complementary connector locked thereto apart may cause damage when the connector and complementary connector are unlocked, the configuration of the described embodiment allows the connector 1 and the complementary connector 3 to be readily unlocked under a high load without causing any damage. Indeed, as described above, the load pulling the connector 1 and the complementary connector 2 apart assists their disengagement by urging the partially unlocked locking member 8 to its fully unlocked position.

The above embodiment is described by way of example only. Many variations are possible without departing from the scope of the invention as defined in the appended claims.

For example, in an alternative embodiment, the mooring line attached to the drilling rig is connected to the connection means 13 on the connector 1 and the mooring line attached to the seabed is connected to the connection means 3 on the complementary connector 2.

The invention claimed is:

1. A connector adapted for release under load from a complementary connector, the connector comprising:
   at least one locking element for engagement with the complementary connector to lock the complementary connector to the connector;
   a locking member moveable from a fully locked position to a fully unlocked position, the locking member being operative to permit the or each locking element to lock the complementary connector to the connector when in the fully locked position and being operative to allow the or each locking element to release the complementary connector from the connector when in the fully unlocked position, wherein the locking member and locking element are arranged such that when the connector is locked to the complementary connector and the locking member is in a partially unlocked position, a load applied to the or each locking element caused by a load urging the connector and the complementary connector apart causes the or each locking element to urge the locking member towards its fully unlocked position, thereby unlocking the complementary connector from the connector, and
   movement means operable to move the locking member from its fully locked position to its partially unlocked position and/or its fully unlocked position,
   wherein the connector further comprises a body, and on moving from the locked position to the unlocked position the locking member moves towards a free end of the connector body.

2. A connector according to 1, comprising a connector body and one or more apertures are formed in the connector body.

3. A connector according to claim 2, wherein the connector body is elongate, defining a longitudinal axis between the ends of the connector body, and has a front end for steering towards a complimentary connector and each aperture is obliquely angled towards the front end of the body, from a radially inward region of the body to a radially outward region of the body.

4. A connector according to claim 3 wherein an angle between an axis of the or each aperture and the longitudinal axis of the connector body is in the range 60 to 70 degrees.

5. A connector according to claim 2, wherein each aperture is for receiving a locking element.

6. A connector according to claim 2, wherein each aperture comprises a portion having a reduction in diameter of the aperture at a radially outer region, thereby to prevent a locking element passing radially out through the aperture.

7. A connector according to claim 2, wherein the apertures are circumferentially substantially equidistantly spaced apart and
   are arranged in one or more rows spaced circumferentially around the connector and
   wherein the or each row of apertures is circumferentially in line with the next row and
   is circumferentially offset from the next row.

8. A connector according to claim 1, further comprising a biasing means for biasing the locking member towards its fully locked position.

9. A connector according to claim 1, further comprising one or more pockets formed in the locking member wherein each pocket is sized and/or shaped for partially housing or receiving a locking element.

10. A connector according to claim 9, wherein each pocket is partially hemispherical and comprises a front edge and a pocket ramp portion.

11. A connector according to claim 10, wherein the front edge and or pocket ramp portion of each pocket is formed at an angle so a locking element received into the pocket urges the locking member from its partially unlocked position towards its fully unlocked position.

12. A connector according to claim 9, wherein each pocket is circumferentially equidistantly spaced apart and wherein the pockets are arranged in at least one or multiple rows spaced circumferentially around the locking member.

13. A connector according to claim 12, wherein each row of pockets is circumferentially in line with the next row and is circumferentially offset from the next row.

14. A connector according to claim 1, further comprising movement means being operable to move the locking member axially relative to the longitudinal axis of the connector.

15. A connector according to claim 14, wherein the movement means is operable to move the locking member from its fully locked position to its partially unlocked position.

16. A connector according to claim 14, wherein the movement means comprises a hydraulic actuator.

17. A connector according to claim 16, wherein the hydraulic actuator comprises an accumulator that is fluidly connected to a cylinder and piston arrangement.

18. A connector according to claim 14, wherein the movement means is configured to be remotely operated and controlled.

19. A connector according to claim 1, wherein the locking element or locking elements are locking balls.

20. A connector assembly comprising a connector adapted for release under load from a complementary connector; and a complementary connector;
the connector comprising:
at least one locking element for engagement with the complementary connector to lock the complementary connector to the connector;
a locking member moveable from a fully locked position to a fully unlocked position, the locking member being operative to permit the or each locking element to lock the complementary connector to the connector when in the fully locked position and being operative to allow the or each locking element to release the complementary connector from the connector when in the fully unlocked position,
wherein the locking member and locking element are arranged such that when the connector is locked to the complementary connector and the locking member is in a partially unlocked position, a load applied to the or each locking element caused by a load urging the connector and the complementary connector apart causes the or each locking element to urge the locking member towards its fully unlocked position, thereby unlocking the complementary connector from the connector, and
movement means operable to move the locking member from its fully locked position to its partially unlocked position and/or its fully unlocked position,
wherein the connector further comprises a body, and on moving from the locked position to the unlocked position the locking member moves towards a free end of the connector body.

* * * * *